United States Patent [19]

George et al.

[11] 4,049,356
[45] Sept. 20, 1977

[54] DOUBLE-SIGMOID CONNECTOR

[75] Inventors: Henry Howard George, Louisville; Ronald Joseph Billings, Fern Creek, both of Ky.

[73] Assignee: Chemetron Corporation, Chicago, Ill.

[21] Appl. No.: 679,098

[22] Filed: Apr. 22, 1976

[51] Int. Cl.² .............................................. F16B 1/00
[52] U.S. Cl. .................................................... 403/173
[58] Field of Search ............... 403/173, 174, 178, 388, 403/175; 52/663, 693, 690; 285/188, 150, 179

[56] References Cited

U.S. PATENT DOCUMENTS

| 2,221,871 | 11/1940 | Kerr | 285/188 X |
| 3,668,876 | 6/1972 | Koehler | 403/175 X |
| 3,709,165 | 11/1973 | Blozis | 403/388 X |
| 3,779,656 | 12/1973 | Guy et al. | 403/174 |

OTHER PUBLICATIONS

Article in Product Engineering, July 1950, pp. 134–135, "How to Connect Tubing – Cross and Tee Joints".

Primary Examiner—Andrew V. Kundrat
Attorney, Agent, or Firm—N. M. Esser

[57] ABSTRACT

In a double-sigmoid connector, as used to interconnect structural members in a trusswork and comprises a pair of arcuate elbows joined to each other at their outer peripheral midsections, a pipe extends through an opening in the outer peripheral midsection of each elbow and is joined to each elbow so as to join the elbow to each other.

5 Claims, 3 Drawing Figures

DOUBLE-SIGMOID CONNECTOR

BACKGROUND OF THE INVENTION

Cross-reference is made to an application filed simultaneously herewith by Robert Charles Paulin and Ronald Joseph Billings, to an application filed simultaneously herewith be Ronald Paul Glanz, and to an application filed simultaneously herewith by John Leonard Carberry, said applications being commonly assigned herewith. As disclosed in said simultaneously filed applications, a double-sigmoid connector has particular utility to interconnect structural members in a trusswork, as in an offshore drilling platform.

SUMMARY OF THE INVENTION

As an improvement in a double-sigmoid connector comprising a pair of arcuate elbows joined to each other at their outer peripheral midsections, a pipe may be extended through an opening in the outer peripheral midsection of each elbow and joined to each elbow so as to join the elbows to each other. The pipe may also be extended through an opening in the inner peripheral midsection of either elbow.

The elbows may be disposed along the pipe for a range of geometric configurations. One configuration allows a mutually orthogonal interconnection of four pipes to be made.

DETAILED DESCRIPTION OF THE EMBODIMENTS

Figure 2:
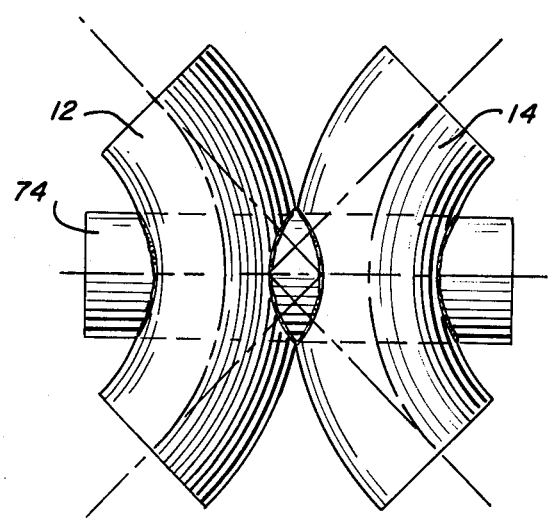

In FIG. 2, a double-sigmoid connector 10 is shown to comprise a pair of arcuate elbows 12 and 14 respectively. Except as noted below, each elbow is identical. Typically, each elbow may be made of forged steel with 48-inch outer diameter and 1.25-inch wall thickness. Each elbow is shown to have a 90° included angle between its ends. Conventional elbows in these sizes have been commercially available from Chemetron Corporation, Tube Turns Division, Louisville, Ky. 40201, for many years.

In the connector 10, the elbows 12 and 14 have coplanar centerlines, and each elbow has opposite ends normal to its centerlines. The connection is symmetrical about an axis through the midpoints of these centerlines. Opposite ends 16 and 18 of the elbow 12 and opposite ends 20 and 22 of the elbow 12 are adapted to be connected respectively by circumferential weldments (not shown) to structural pipes (not shown) of suitable diameter and wall thickness. The ends 16 and 18 and the ends 20 and 22 may be beveled in conventional manner as desired to accomodate such weldments.

An opening 70 is provided in the outer peripheral midsection of the elbow 12. An opening 72 similarly is provided in the outer peripheral midsection of the elbow 14. The openings 70 and 72 are sized to accomodate a pipe 74 typically formed with 36-inch outer diameter and a proportionate wall thickness. The pipe 74 extends through the opening 70, where the pipe 74 is formed to the elbow 12 by circumferential weldment around the opening 70, and similarly extends through the opening 72, where the pipe 74 is joined to the elbow 14 by circumferential weldment around the opening 72, whereby the elbows 12 and 14 are joined to each other at their outer peripheral midsections.

An opening 76 is provided in the inner peripheral midsection of the elbow 12. An opening 78 similarly is provided in the inner peripheral midsection of the elbow 14. The openings 76 and 78 are sized to accomodate the pipe 74 which extends through the opening 76, where the pipe 74 is joined to the elbow 12 by circumferential weldment around the opening 76. Similarly, the pipe 74 extends through the opening 78, where the pipe 74 is joined to the elbow 14 by circumferential weldment around the opening 78.

Opposite ends 80 and 82 of the pipe 74 are adapted to be connected by circumferential weldments (not shown) to structural pipes (not shown) of suitable diameter and wall thickness. These ends 80 and 82 may be beveled as the ends 16 and 18 or the ends 20 and 22 may be beveled.

If a four-way interconnection is to be made rather than a six-way interconnection, such extension of the pipe through such openings in the inner peripheral midsections of the elbows need not be made. Nonetheless, such extension may make the connector 10 able to sustain greater stresses.

Figure 1:
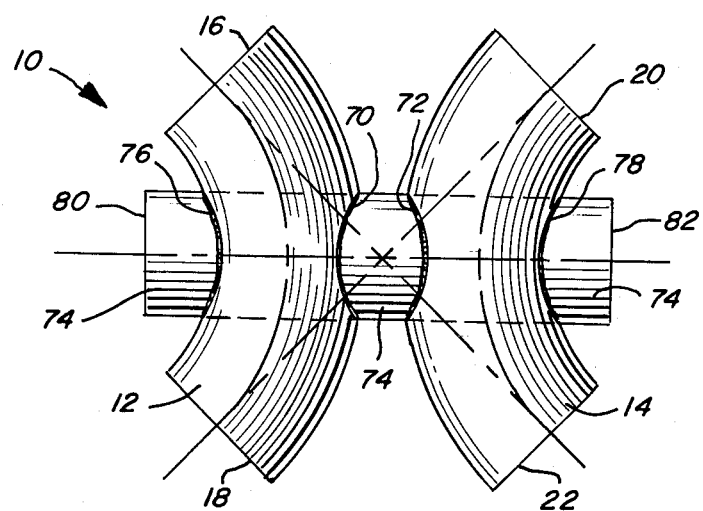
FIGS. 1 through 3 respectively are elevational views of a double-sigmoid connector in various configurations constituting possible embodiments of this invention.

In FIG. 1, the elbows 12 and 14 are so disposed along the pipe 74 that the end 16 of the elbow 12 and the end 22 of the elbow 14 define parallel coincident axes, that the end 20 of the elbow 14 and the end 18 of the elbow 12 define parallel coincident axes. These axes intersect the longitudinal central axes of the pipe 74 at coincident points.

Figure 3:
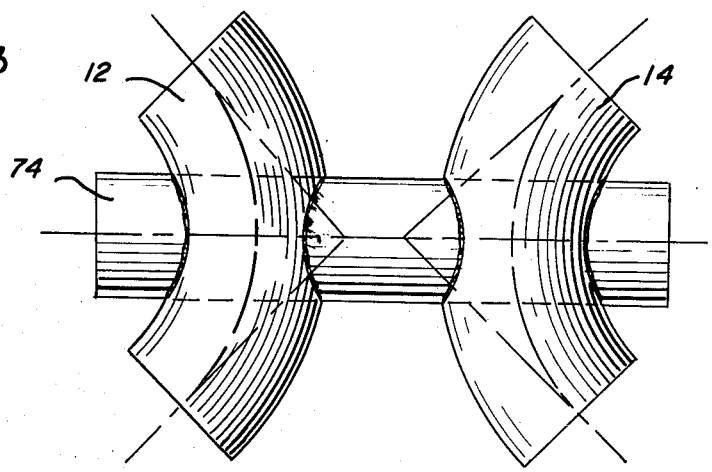

In FIG. 2, the elbows 12 and 14 are disposed closer to each other along the pipe 74, whereby the axes defined by opposite ends of each elbow are spaced from each other an alignment said to be with positive, i.e., the point where the axes defined by the ends of one elbow 12 intersects the axes of the pipe 74 is located within the elbow 14 and vice-versa. In FIG. 3, the elbows 12 and 14 are disposed farther from each other along the pipe 74, whereby the axes defined by opposite ends of each elbow, are spaced from each other with an alignment said to be negative, i.e., the point where the axes defined by the ends of the elbow 12 intersects the elbow 14 is located without the elbow 14 and vice versa. FIG. 1 is said to show central alignment. Countless permutations are thus possible.

With suitable openings (not shown) for fluid flow from either end of the elbow 12 through the pipe 74 to the elbow 14 and vice versa, and with sound weldments, as and where described above, the connector 10 may be used as a pressure-containing vessel. Although the connector 10 has been described with exemplary dimensions suitable for an offshore drilling platform and other large-scale structures, such connectors can also be made to smaller scales for smaller structures.

We claim:

1. In a double-sigmoid connector comprising a pair of arcuate elbows joined to each other at their outer peripheral midsections, an improvement wherein a pipe extends through an opening in the outer peripheral midsection of each elbow and is joined to each elbow so as to join said elbows to each other and wherein said pipe has alongitudinal central axis and each elbow has opposite ends respectively defining central axes intersecting the axis of said pipe at a point and wherein the points where the axes defined by the ends of said elbows intersect the axis of said pipe are spaced from each other.

2. The improvement of claim 1 wherein the point where the axes defined by the ends of each elbow intersect the axis of said pipe is located within the other said elbow.

3. The improvement of claim 1 wherein the point where the axes defined by the end of each elbow intersect the axis of said pipe is located without either elbow.

4. The improvement of claim 1 wherein said pipe also extends through an opening in the inner peripheral midsection of one elbow.

5. The improvement of claim 1 wherein said pipe also extends through an opening in the inner peripheral midsection of each elbow.

* * * * *